United States Patent [19]

Gwilliam et al.

[11] 4,366,055
[45] Dec. 28, 1982

[54] PRESSURE FILTERS

[75] Inventors: Ralph D. Gwilliam; David Eggleston, both of St. Austell, England

[73] Assignee: English Clay Lovering Pochin & Company, St. Austell, England

[21] Appl. No.: 242,381

[22] Filed: Mar. 10, 1981

[30] Foreign Application Priority Data

Mar. 18, 1980 [GB] United Kingdom ............... 8009098

[51] Int. Cl.³ ............................................. B01D 29/42
[52] U.S. Cl. ...................................... 210/350; 100/211
[58] Field of Search .................. 210/350; 100/112, 211

[56] References Cited

U.S. PATENT DOCUMENTS

| | | | |
|---|---|---|---|
| 3,276,594 | 10/1966 | Gwilliam | 210/350 |
| 3,712,209 | 1/1973 | Gwilliam | 210/350 |
| 3,713,382 | 1/1973 | Gwilliam | 210/350 |
| 3,753,499 | 8/1973 | Gwilliam | 210/350 |
| 3,900,403 | 8/1975 | Randle | 210/350 |
| 4,061,575 | 12/1977 | Randle | 210/350 |
| 4,214,991 | 7/1980 | Broad | 210/350 |

Primary Examiner—John Adee
Attorney, Agent, or Firm—Weingram & Klauber

[57] ABSTRACT

A tube pressure filter comprises (a) a pair of generally coaxial inner and outer tubular assemblies, which define between them a chamber of annular cross-section, (b) an impermeable elastic sleeve which divides said chamber into non-intercommunicating inner and outer compartments, (c) a filter element, (d) a slurry inlet extending annularly around one of the tubular assemblies for feeding a slurry to said inner compartment, (e) a hydraulic fluid inlet/outlet for feeding hydraulic fluid to and withdrawing hydraulic fluid from the outer compartment, (f) filtrate discharge means for the discharge of filtrate which has passed through the filter element and through apertures in the inner tubular assembly into the chamber, and (g) means for effecting relative movement of said tubular assemblies from one to another of three operating positions of said tubular assemblies. In the first operating position of said tubular assemblies the slurry inlet is in communication with said inner compartment but the inner compartment is otherwise closed whereby a slurry to be pressure filtered can be fed to the inner compartment via said slurry inlet. In the second operating position of said tubular assemblies said inner compartment is closed and said slurry inlet cooperates with means formed by or associated with the other one of said pair of tubular assemblies to isolate said slurry inlet from said inner compartment whereby said slurry to be pressure filtered can be dewatered. In the third operating position of the tube pressure filter said inner compartment is open so that particulate solid can be discharged from the inner compartment.

4 Claims, 4 Drawing Figures

4,366,055

PRESSURE FILTERS

BACKGROUND OF THE INVENTION

This invention relates to pressure filters.

In recent years, there has been developed a type of pressure filter, conveniently called a tube pressure filter, which is capable of operating at high pressures, that is to say at pressures in excess of 500 pounds per sq. inch (35.2 kg/cm$^2$). Tube pressure filters can be used in the filtration of a wide range of materials, including aqueous slurries of particulate solids, such as, for example, mineral pigments, insoluble oxides and hydroxides of metals, refractories and coal dust. Whilst tube pressure filters are of particular value in the pressure filtration of aqueous slurries, such as clay slurries, containing a relatively large proportion of fine particles (since such slurries often cannot be so readily dewatered using other known types of filtration equipment), they may also be used in the pressure filtration of slurries of other particulate solids, including those of a coarse, granular or fibrous nature such as, for example, slurries of particulate solids containing particles larger than 0.5 mm, or waste water from paper mills and from various operations in the textile industry.

Several kinds of tube pressure filter have been described, and details of the construction and operation of some of these are given, for example in British Patent Specification Nos. 907,485; 1,240,465; 1,240,466; 1,271,494; 1,317,887; 1,336,856; 1,340,858; 1,351,142; 1,351,943; 1,355,553; 1,362,655 and 1,386,256; and in the U.S. Pat. No. 3,900,403. Most tube pressure filters comprise a pair of generally coaxial inner and outer tubular assemblies which are arranged one within the other and define between them a chamber of annular or substantially annular cross-section and which are adapted to be supported in a generally upright position, an impermeable elastic sleeve secured to the outer one of said pair of tubular assemblies so as to divide said chamber into non-intercommunicating inner and outer compartments, a filter element disposed around and supported by the inner tubular assembly, a slurry inlet for feeding a slurry to be pressure filtered to the inner compartment, a hydraulic fluid inlet for feeding a hydraulic fluid to the outer compartment and a hydraulic fluid outlet for withdrawing hydraulic fluid from the outer compartment, filtrate discharge means for use in effecting the discharge of filtrate which has passed through the filter element and through apertures in the inner tubular assembly, and means for use in effecting the discharge of solid material retained in said inner compartment.

The filter element of a tube pressure filter usually comprises a sleeve of filter cloth material, advantageously supported on a wire mesh screen, which fits snugly around the inner tubular assembly of the tube pressure filter.

Usually, the means for use in effecting the discharge of solid material retained in said inner compartment comprises means for displacing the tubular assemblies axially relative to one another between two operating positions. In one of the operating positions, a slurry to be dewatered can be fed through the slurry inlet to fill the inner compartment (which is otherwise closed) and thereafter the slurry can be dewatered by supplying hydraulic fluid under pressure to the outer compartment; and in the other operating position, the outer compartment is empty, the hydraulic fluid having been withdrawn from the outer compartment, and the inner compartment is open to enable the solid material retained in the inner compartment after the dewatering process has been completed, to be discharged from the tube pressure filter. During the dewatering of the slurry in the inner compartment, the liquid component of the slurry is forced through the filter element (and through apertures in the inner tubular assembly) while the particulate solid component of the slurry is retained on the filter element.

In the known tube pressure filters, a slurry to be dewatered has generally been introduced into the inner compartment of the tube pressure filter via a slurry inlet which is formed in the inner tubular assembly and is in communication with the inner compartment of the tube pressure filter throughout the period when pressure is being applied to the slurry in the inner compartment, by means of the hydraulic fluid in the outer compartment, to dewater the same. The slurry inlet usually takes the form of a very narrow orifice or of an orifice the mouth of which can be closed by means of a device, for example an elastic ring, acting as a non-return valve. If the orifice is neither narrow nor capable of being closed by means of a non-return valve, there exists a risk that the impermeable elastic sleeve which separates the inner and outer compartments will be extruded into the orifice under the action of the very high hydraulic pressures which are exerted on the impermeable elastic sleeve during the dewatering of the slurry in the inner compartment. Unfortunately, it is found that when the feed material to be dewatered is a slurry of a particulate solid which is a coarse, granular or fibrous material, the particulate solid tends to block the narrow orifice or to cause damage to the non-return valve which is used to close the orifice. A more complicated form of slurry inlet has been proposed in British Patent Specification No. 907,485 which discloses some embodiments of tube pressure filter in which the inner compartment is isolated from the slurry inlet during the dewatering process with the slurry inlet comprising a poppet valve system which is incorporated in either the inner or the outer tubular assembly. However, these embodiments require the poppet valve system to operate immersed in the feed slurry so that fouling of the poppet valve and/or of its valve seat by solid material in the feed slurry in likely to occur, especially when the feed slurry contains a coarse, granular or fibrous material, with consequential excessive wear of the poppet valve and its valve seat.

SUMMARY OF THE INVENTION

According to the present invention there is provided a tube pressure filter which comprises (a) a pair of generally coaxial inner and outer tubular assemblies which are arranged one within the other so as to define between them a chamber of annular or substantially annular cross-section and which are adapted to be supported in a generally upright position, (b) an impermeable elastic sleeve disposed within and secured to the outer one of said pair of tubular assemblies so as to divide said chamber into non-intercommunicating inner and outer compartments, (c) a filter element disposed around and supported by the inner one of said pair of tubular assemblies, (d) a slurry inlet for feeding a slurry to be pressure filtered to said inner compartment, (e) a hydraulic fluid inlet for feeding hydraulic fluid to the outer compartment, and a hydraulic fluid outlet for withdrawing hydraulic fluid from the outer compartment, (f) filtrate discharge means for use in effecting the discharge of filtrate which has passed through the filter element and through apertures in the inner tubular assembly, and (g) means for effecting relative movement of said tubular assemblies from one to another of three operating positions of said tubular assemblies; wherein said slurry inlet extends annularly around one of said pair of tubular assemblies and, in one of said three operating positions, cooperates with means formed by or associated with the other one of said pair of tubular assemblies to isolate said slurry inlet from said inner compartment, and wherein the arrangement is such that, in the first operating position of said tubular assemblies the slurry inlet is in communication with said inner compartment but the inner compartment is otherwise closed whereby a slurry to be pressure filtered can be fed to the inner compartment via said slurry inlet, in the second operating position of said tubular assemblies said inner compartment is closed and said slurry inlet cooperates with said means formed by or associated with the other one of said pair of tubular assemblies to isolate said slurry inlet from said inner compartment whereby said slurry to be pressure filtered can be dewatered, and in the third operating position of the tube pressure filter said inner compartment is open so that particulate solid can be discharged from the inner compartment.

With a tube pressure filter in accordance with the present invention it is possible to handle feed suspensions containing coarse, granular or fibrous solid materials which were difficult to handle with known tube pressure filters, and it is also possible to operate safely at higher pressures than is possible with the known tube pressure filters.

The slurry inlet can be located at the lower end or at the upper end of the tube pressure filter. Preferably the slurry inlet extends annularly around the outer tubular assembly.

The means for moving the tubular assemblies relative to one another preferably comprises two pneumatic cylinders connected "back to back", i.e. in line, with the closed end of the first pneumatic cylinder rigidly connected to the closed end of the second pneumatic cylinder, and arranged so that one of the two pneumatic cylinders is actuated to displace the inner tubular assembly relative to the outer tubular assembly from the first to the second position, and both pneumatic cylinders are actuated to displace the inner tubular assembly relative to the outer tubular assembly from the second position to the third position. However, other pneumatic, hydraulic, mechanical or electromagnetic means may be used to displace the inner tubular assembly and the outer tubular assembly relative to one another, provided that suitable means are installed to bring the tubular assemblies to rest in the required relative positions.

DESCRIPTION OF PREFERRED EMBODIMENT OF THE INVENTION

For a better understanding of the invention and to show more clearly how the same may be carried into effect, reference will now be made, by way of example, to the accompanying drawings, in which.

Figure 1:
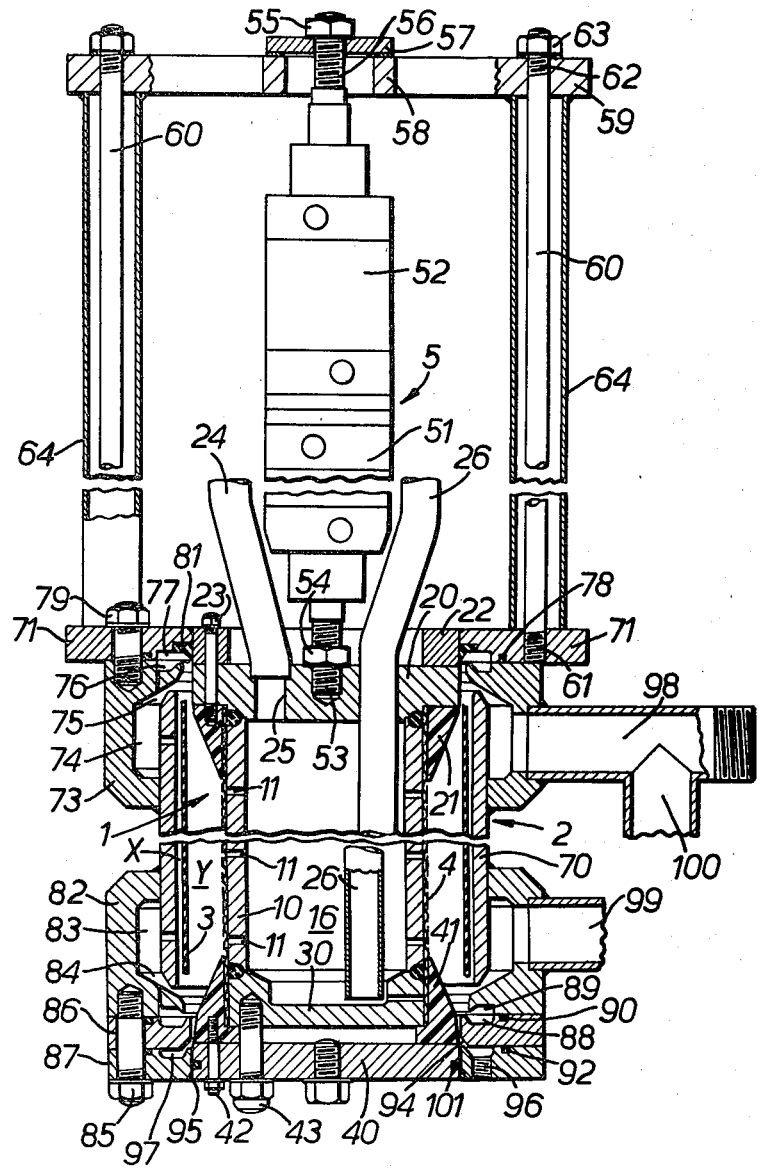
FIG. 1 is a diagrammatic sectional view of a tube pressure filter with the tubular assemblies in their first relative position.
Figure 2:
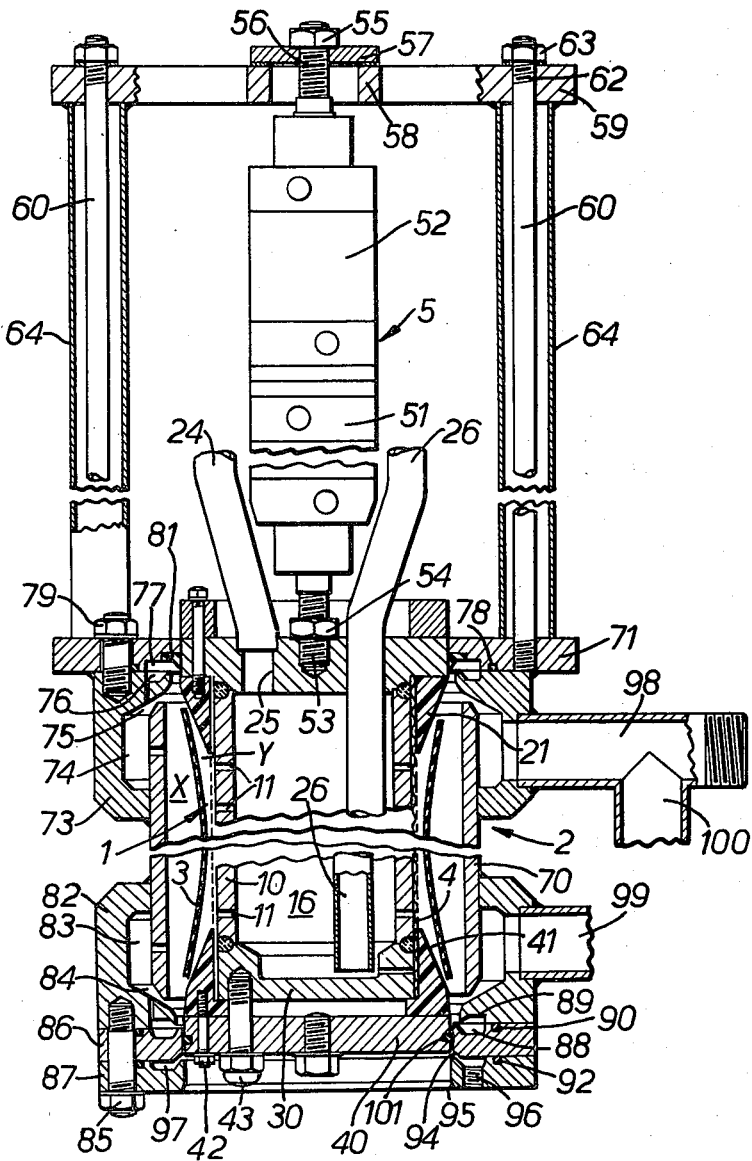
FIG. 2 is a diagrammatic sectional view of the tube pressure filter of FIG. 1 with the tubular assemblies in their second relative position.

The tube pressure filter comprises an inner tubular assembly 1 and an outer tubular assembly 2 which are arranged coaxially one within the other and in an upright position. The tube pressure filter also comprises an impermeable elastic sleeve 3 (only part of which is shown in FIGS. 1 and 2) disposed within and secured at each end thereof to the outer tubular assembly 2, a filter element 4 which is disposed around and supported by the inner tubular assembly 1, and means 5 for moving the inner and outer tubular assemblies relative to one another from one to another of three operating positions. The inner and outer tubular assemblies 1 and 2 define between a chamber of annular cross-section which is divided into non-intercommunicating compartments X and Y by the impermeable elastic sleeve 3.

The inner tubular assembly 1 comprises a central cylindrical section 10 drilled with a plurality of apertures 11 through which filtrate can pass to the inside of the inner tubular assembly 1 into a chamber 16, an upper end cap 20 and an inner lower end cap 30, both of which end caps are welded to the central cylindrical section 10, and an outer lower end cap 40 which is secured by screws 43 to the inner lower end cap 30. A lower annular fairing 41 made from aluminum bronze is secured by screws 42 to the outer lower end cap 40. An upper annular fairing 21, also made from aluminum bronze, and a top ring 22 are secured to the upper end cap 20 by screws 23. An inlet pipe 24 for compressed air communicates with the chamber 16 through a bore 25 in the upper end cap 20.

Associated with the inner tubular assembly is a filtrate discharge means which includes an outlet pipe 26. The outlet pipe 26 passes through the upper end cap 20 and into the chamber 16 where it extends to the bottom of the chamber 16 adjacent the inner lower end cap 30. The chamber 16 received filtrate which passes through the bores 11. The filtrate is withdrawn from chamber 16 through outlet pipe 26.

The means 5 for moving the inner and outer tubular assemblies relative to one another comprises two pneumatic cylinders 51 and 52. A hole in the centre of the upper end cap 20 is tapped to receive the threaded end portion of a piston rod 53 of the first pneumatic cylinder 51 which has a stroke of 12 inches (305 mm). A lock nut 54 is provided to prevent relative movement between the piston rod 53 and the upper end cap 20. The first pneumatic cylinder is rigidly connected at its closed end with the closed end of the second pneumatic cylinder 52 which has a stroke of 1¼ inches (32 mm). The threaded end of a piston rod 56 of the second pneumatic cylinder is connected to a tapped hole in a circular plate 57 which covers the central circular boss 58 of a three-armed spider 59. A lock nut 55 holds the piston rod 56 firmly in place. The outer ends of the arms of the spider 59 are connected by studs 60 to an annular top plate 71 of the outer tubular assembly 2. The lower ends 61 of the studs 60 are received in tapped holes in the annular top plate 71 and the upper ends 62 of the studs 60 pass through clearance holes in the ends of the arms of the spider and are secured by nuts 63. The spider is maintained at the required fixed distance above the annular top plate 71 by means of tubular members 64 which are welded at their upper ends to the spider.

The outer tubular assembly comprises a central cylindrical section 70 to which there is welded at the upper end an upper collar member 73 which defines with the cylindrical section 70 a gallery 74 for distributing hydraulic fluid around the wall of the outer tubular assembly. Hydraulic fluid passes from the gallery 74 via a tapering annular inlet/outlet 75 into the outer compartment (compartment X) defined between the inner wall of the outer tubular body and the outer wall of the impermeable elastic sleeve 3. An annular groove 76 in the upper collar member 73 cooperates with an annular groove 77 in the annular top plate 71 to form a cavity in which there is accommodated the rim of the upper end of the impermeable elastic sleeve 3. A flexible sealing ring 81 serves the dual purposes of helping to confine the rim of the impermeable elastic sleeve 3 in the cavity and of forming a seal between the inner and outer tubular assemblies. An O-ring seal 78 accommodated in a groove forms a seal between the collar member 73 and the annular top plate 71. The annular top plate 71 is secured to the upper collar member 73 by means of screws 79. At the lower end of the outer tubular assembly a lower collar member 82 is welded to the cylindrical section 70 and defines therewith a gallery 83 for hydraulic fluid. Hydraulic fluid passes from the gallery 83 via a tapering annular inlet/outlet 84 into compartment X. A pipe 98 for hydraulic fluid communicates with the gallery 74, and a pipe 99 communicates with gallery 83. Pipes 98 and 99 are connected together by a vertical pipe 100. The pipes 98, 99 and 100, the galleries 74 and 83, and the inlet/outlets 75 and 84 constitute the hydraulic fluid inlet and hydraulic fluid outlet for the tube pressure filter.

Secured to the lower collar member 82 by screws 85 are an inner bottom ring 86 and an outer bottom ring 87. The inner bottom ring 86 is provided with an annular groove 88 which cooperates with an annular groove 89 in the lower collar member 82 to form a cavity in which there is accommodated the rim of the lower end of the impermeable elastic sleeve 3. An O-ring seal 90 accommodated in a groove forms a seal between the inner bottom ring 86 and the lower collar member 82, and an O-ring seal 92 accommodated in a groove forms a seal between the outer bottom ring 87 and the inner bottom ring 86. The inner bottom ring 86 and the outer bottom ring 87 are identical except that the inner bottom ring has a more pronounced bevel at 94 than the outer bottom ring has at 95. The outer bottom ring 87 is provided with an annular groove 97 and one or more inlets 96 which form a slurry inlet and serve to distribute a feed slurry to be pressure filtered around the wall of the outer tubular assembly and from there into the inner compartment when the inner and outer tubular assemblies are in their first position. The groove 97 has a width at the top of 27 mm and a maximum depth of 9.5 mm. The bevel 94 is at an angle 45° to the axis of the tube pressure filter with each of the two faces which originally met in a right angle being cut back to 8.5 mm from the right angle. The shape of the bottom part of the fairing 41 is such that the annular passage for feed slurry between the fairing 41 and the inner bottom ring 86 is 1.780 mm in width at its narrowest point. An O-ring seal 101 accommodated in a groove forms a seal between the inner and outer tubular bodies at the lower end, but a flexible sealing ring of the same type as 81 could equally well be used at the lower end. The O-ring seal 101 ensures that the slurry inlet is isolated from the inner compartment when the inner and outer tubular assemblies are in their second position.

Figure 3:
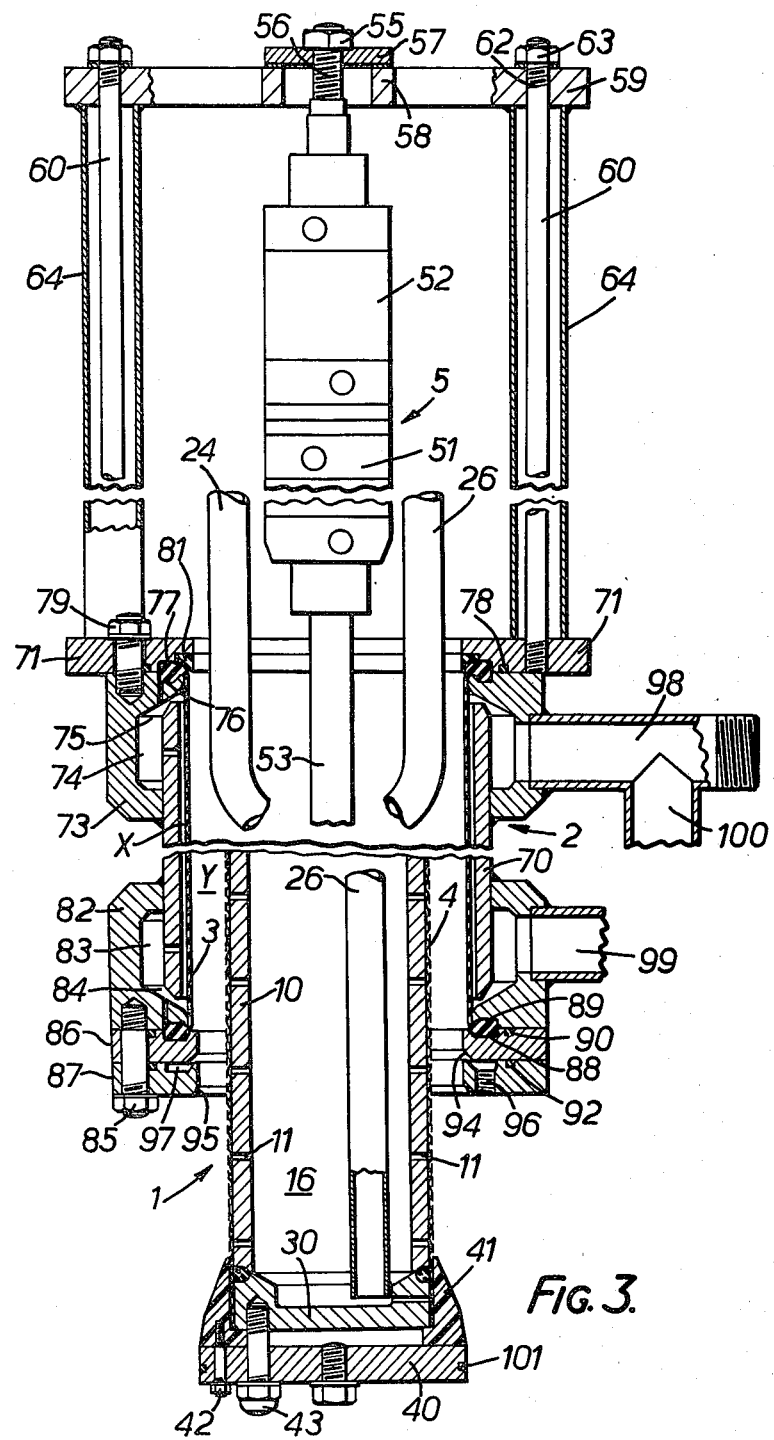
FIG. 3 is a diagrammatic sectional view of the tube pressure filter of FIG. 1 with the tubular assemblies in their third relative position.

The cycle of operations may be said to commence just before the inner and outer tubular assemblies are moved to their first position. At this point the pistons of both pneumatic cylinders 51 and 52 are at their maximum displacement so that the inner tubular assembly is displaced vertically downwards with respect to the outer tubular assembly and the tubular assemblies are in their third position as shown in FIG. 3. The inner compartment is empty and the pressure in the hydraulic fluid pipes 98 and 99 is reduced to below atmospheric so that the impermeable elastic sleeve 3 is drawn back against the inner wall of the outer tubular assembly. To move the tubular assemblies to their first position compressed air is applied to the pneumatic cylinder 51 to return its piston to the position of zero displacement, thus moving the inner tubular assembly into the first relative position of the inner and outer tubular assemblies as shown in FIG. 1 (and in the left-hand half of FIG. 4). In this position the outer surface of the outer lower end cap 40 of the inner tubular assembly is flush with the outer surface of the outer bottom ring 87 of the outer tubular assembly, and the annular groove 97 communicates with the inner compartment Y (formed between the filter element 4 and the inner wall of the impermeable elastic sleeve 3—as shown on the left in FIG. 4). The O-ring seal 101 forms a liquid-tight seal with the outer bottom ring 87, and the flexible sealing ring 81 forms a liquid-tight seal with the top ring 22. The impermeable elastic sleeve 3 is kept drawn back against the inner wall of the outer tubular assembly at least until the inner tubular assembly has come to rest. Feed suspension is then supplied through the inlets 96 to the annular groove 97 and issues through the annular orifice formed between the bevelled portion 94 of the inner bottom ring 86 and the outer end cap 40 and then between the vertical portion of the inner wall of the inner bottom ring 86 and the sloping face of the fairing 41. Meanwhile hydraulic fluid at a pressure of about 40–50 psig. (270–350 kNm$^{-2}$) is supplied through pipes 98 and 99 for a few seconds in order to inflate the impermeable elastic sleeve slightly and prevent it from being forced into the annular inlets 75 and 84 by the pressure of the feed suspension.

Figure 4:
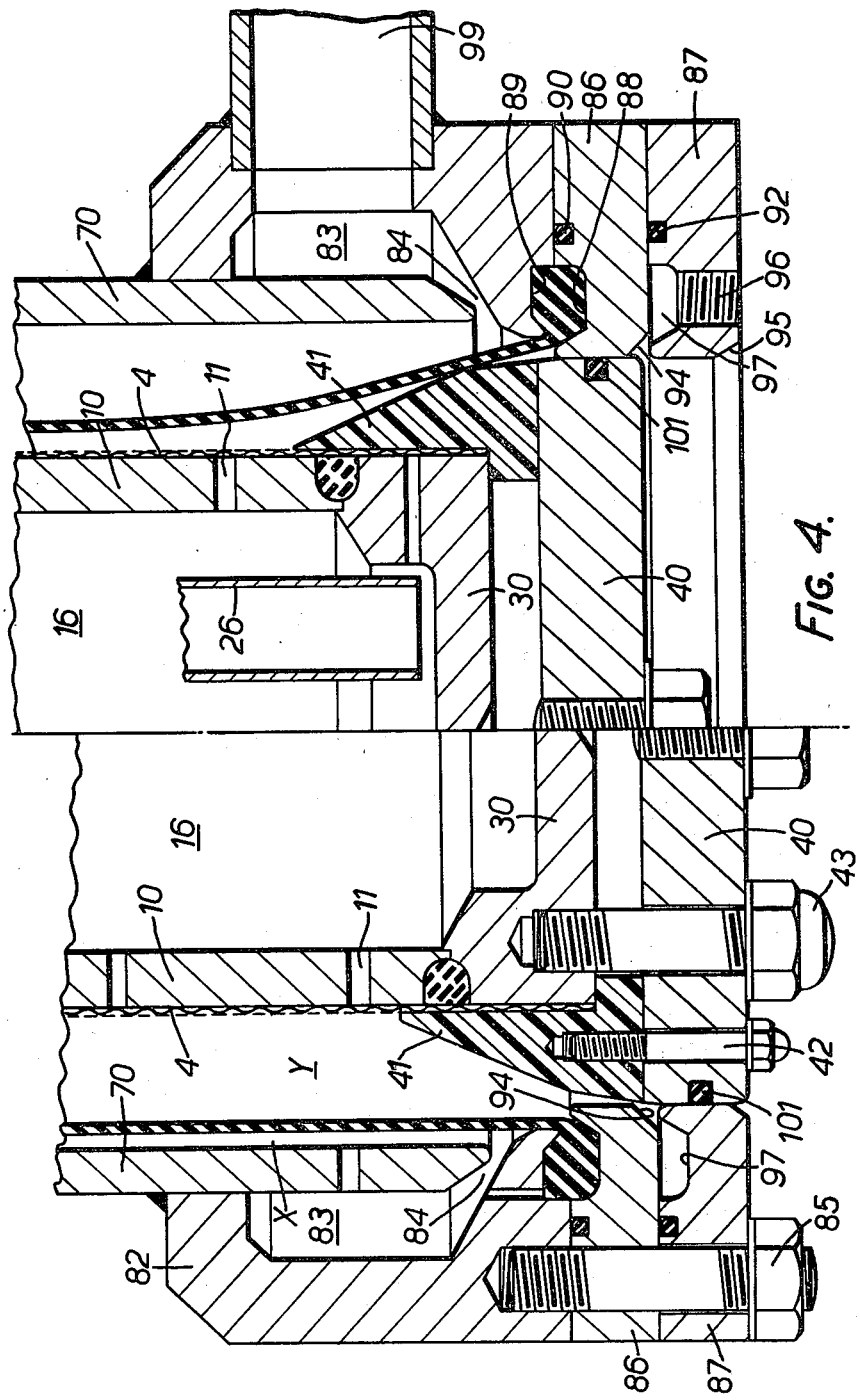
FIG. 4 shows on an enlarged scale a detail of the same tube pressure filter when in the positions illustrated in FIGS. 1 and 2.

When a full charge of feed suspension has been introduced into compartment Y, compressed air is applied to the pneumatic cylinder 52 thus returning its piston to the position of zero displacement and moving the inner tubular assembly to the position shown in FIG. 2 (and in the right-hand half of FIG. 4). In this position the O-ring seal 101 forms a liquid-tight seal with the inner bottom ring 86 and the flexible sealing ring 81 forms a liquid-tight seal with the upper end cap 20, this corresponding to the second position of the tubular assemblies. Hydraulic fluid is supplied through pipes 98, 100 and 99 at a pressure which is increased continuously or in discrete steps until the maximum working pressure is attained in order to apply pressure on the feed suspension by means of the impermeable elastic sleeve 3 (as shown on the right in FIG. 4) and thus expel filtrate through the filter element 4 and through the apertures 11 into chamber 16 from where it is removed through outlet pipe 26. A filter cake is formed on a filter element 4. When the flow of filtrate has substantially ceased, hydraulic fluid is withdrawn from compartment X through pipes 98, 99 and 100 in order to draw the impermeable elastic sleeve 3 back against the inner wall of the outer tubular assembly 2. Compressed air is then applied to both pneumatic cylinders 51 and 52 in order to displace both pistons to their maximum extent and move the inner tubular assembly vertically downwards relative to the outer tubular assembly to their third position as shown in FIG. 3. In this position the filter cake either falls from the surface of the filter element 4 or can be dislodged by applying one or more discrete blasts of compressed air through pipe 24 to the chamber 16 formed in the interior of the inner tubular assembly 1.

The invention is further illustrated by the following Examples.

EXAMPLE 1

An attempt was made to dewater in a tube pressure filter of the type disclosed in British Patent Specification No. 1,240,465 a cement kiln feed slurry comprising about 50% by weight of a dry mixture of chalk and clay which contained particles of flint of up to about 1 mm in diameter. The slurry was very viscous and it was therefore impracticable to attempt to remove the coarse flint particles by means of a sieve. It was found that after about ten filtration cycles with the known tube pressure filter it was necessary to stop the operation to remove coarse particles which blocked or partially blocked the slurry inlet of the pressure filter.

A further sample of the same slurry was dewatered in a tube pressure filter in accordance with the present invention and 250 filtration cycles were successfully completed.

EXAMPLE 2

An attempt was made to dewater in the tube pressure filter of the type disclosed in British Patent Specification No. 1,240,465 a paper mill waste slurry which contained about 5% by weight of cellulosic fibres. It was found that after about five filtration cycles a mat of fibres began to build up in the channels of the slurry inlet of the pressure filter and it was necessary to suspend filtration so that the feed channels could be cleaned.

A further sample of the same slurry was dewatered in a tube pressure filter in accordance with the present invention and 250 filtration cycles were successfully completed.

What is claimed is:

1. In a tube pressure filter which comprises (a) a pair of generally coaxial inner and outer tubular assemblies which are arranged one within the other so as to define between them a chamber of annular, or substantially annular, cross-section and which are adapted to be supported in a generally upright position, (b) an impermeable elastic sleeve disposed within and secured to the outer one of said pair of tubular assemblies so as to divide said chamber into non-intercommunicating inner and outer compartments, (c) a filter element disposed around and supported by the inner one of said pair of tubular assemblies, (d) a slurry inlet for feeding a slurry to be pressure filtered to said inner compartment, (e) a hydraulic fluid inlet for feeding hydraulic fluid to the outer compartment, and a hydraulic fluid outlet for withdrawing hydraulic fluid from the outer compartment, (f) filtrate discharge means for use in effecting the discharge of filtrate which has passed through the filter element and through apertures in the inner tubular assembly, and (g) means for effecting relative movement of said tubular assemblies; the improvement which comprises providing means for effecting relative movement of said tubular assemblies from one to another of three operating positions of said tubular assemblies and providing a slurry inlet which extends annularly around one of said pair of tubular assemblies and which, in one of said three operating positions, cooperates with means formed by or associated with the other one of said pair of tubular assemblies to isolate said slurry inlet from said inner compartment, the arrangement being such that, in the first operating position of said tubular assemblies the slurry inlet is in communication with said inner compartment which is otherwise closed whereby a slurry to be pressure filtered can be fed to the inner compartment via said slurry inlet, in the second operating position of said tubular assemblies said inner compartment is closed and said slurry inlet cooperates with said means formed by or associated with the other one of said pair of tubular assemblies to isolate said slurry inlet from said inner compartment whereby said slurry to be pressure filtered can be dewatered, and in the third operating position of said tubular assemblies said inner compartment is open so that particulate solid can be discharged from the inner compartment.

2. A tube pressure filter as claimed in claim 1, wherein the slurry inlet extends annularly around the outer tubular assembly.

3. A tube pressure filter as claimed in claim 1 or 2, wherein the slurry inlet is located at the lower end of the tube pressure filter.

4. A tube pressure filter as claimed in claim 1, wherein the means for moving the tubular assemblies relative to one another comprises two pneumatic cylinders connected "back-to-back" in a manner such that one of the two pneumatic cylinders can be actuated to displace the inner tubular assembly relative to the outer tubular assembly between the first and the second relative positions thereof, and both pneumatic cylinders can be actuated to displace the inner tubular assembly relative to the outer tubular assembly between the second and the third relative positions thereof.

* * * * *